(12) United States Patent
Kawakami et al.

(10) Patent No.: US 9,033,831 B2
(45) Date of Patent: May 19, 2015

(54) BELT-DRIVEN CONTINUOUSLY VARIABLE TRANSMISSION

(75) Inventors: Takaho Kawakami, Susono (JP); Tomoaki Yanagida, Susono (JP); Shuji Moriyama, Susono (JP); Takuro Morino, Mumazu (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 109 days.

(21) Appl. No.: 14/000,334

(22) PCT Filed: Mar. 23, 2011

(86) PCT No.: PCT/JP2011/056969
§ 371 (c)(1),
(2), (4) Date: Aug. 19, 2013

(87) PCT Pub. No.: WO2012/127651
PCT Pub. Date: Sep. 27, 2012

(65) Prior Publication Data
US 2013/0324334 A1    Dec. 5, 2013

(51) Int. Cl.
*F16H 59/00* (2006.01)
*F16H 61/00* (2006.01)
*F16H 63/00* (2006.01)
*F16H 9/16* (2006.01)
*F16H 55/56* (2006.01)
(Continued)

(52) U.S. Cl.
CPC ............... *F16H 9/16* (2013.01); *F16H 55/56* (2013.01); *F16H 61/66272* (2013.01); *F16H 63/065* (2013.01)

(58) Field of Classification Search
CPC ............ F16H 61/66272; F16H 55/56; F16H 61/66259; F16H 61/662; F16H 63/065
USPC ........................................ 474/18, 19
See application file for complete search history.

(56) References Cited

U.S. PATENT DOCUMENTS

| | | | | |
|---|---|---|---|---|
| 2,155,351 A | * | 4/1939 | Paulus | 474/12 |
| 2,276,186 A | * | 3/1942 | Getchell | 474/19 |
| 2,900,834 A | * | 8/1959 | Bessette | 474/19 |

(Continued)

FOREIGN PATENT DOCUMENTS

| | | |
|---|---|---|
| JP | 2009-2414 A | 1/2009 |
| WO | 2010/021218 A1 | 2/2010 |

*Primary Examiner* — Henry Liu
(74) *Attorney, Agent, or Firm* — Sughrue Mion, PLLC

(57) ABSTRACT

A belt-driven continuously variable transmission having a downsized torque cam assembly for creating forward thrust to push a movable sheave toward a fixed sheave.
The belt-driven continuously variable transmission is adapted to output a torque while changing a speed ratio continuously by altering an effective diameter position of a driving belt. The belt-driven continuously variable transmission is comprised of: an output gear, which is fitted onto the rotary shaft of the driven pulley to output the torque while being allowed to rotate relatively; a piston, which is fitted onto the rotary shaft of the driven pulley between the movable sheave and the output gear while being allowed to rotate integrally with the movable sheave and to reciprocate in an axial direction of the rotary shaft, and which increases an internal pressure of the hydraulic chamber by moving toward the movable sheave; and a torque cam assembly, which is interposed between the piston and the output gear, and which pushes the piston toward the movable sheave when the torque transmitted through the driven pulley is increased.

6 Claims, 2 Drawing Sheets

(51) Int. Cl.
 *F16H 61/662* (2006.01)
 *F16H 63/06* (2006.01)

(56) References Cited

U.S. PATENT DOCUMENTS

| | | | | |
|---|---|---|---|---|
| 3,110,189 A * | 11/1963 | Steuer | | 474/18 |
| 3,190,135 A * | 6/1965 | Berens | | 474/19 |
| 4,722,718 A * | 2/1988 | Eugen | | 474/19 |
| 4,722,719 A * | 2/1988 | Klopfenstein | | 474/28 |
| 5,169,365 A * | 12/1992 | Friedmann | | 474/18 |
| 5,184,981 A * | 2/1993 | Wittke | | 474/19 |
| 5,295,915 A * | 3/1994 | Friedmann | | 474/18 |
| 5,527,225 A * | 6/1996 | Dick | | 474/12 |
| 5,711,730 A * | 1/1998 | Friedman et al. | | 474/18 |
| 5,879,253 A * | 3/1999 | Friedmann et al. | | 474/18 |
| 6,068,565 A * | 5/2000 | Riemer et al. | | 474/18 |
| 6,123,634 A * | 9/2000 | Faust et al. | | 474/8 |
| 6,186,917 B1 * | 2/2001 | Friedmann et al. | | 474/18 |
| 6,241,635 B1 * | 6/2001 | Schmid et al. | | 474/11 |
| 6,277,043 B1 * | 8/2001 | Friedmann | | 474/18 |
| 6,322,466 B1 * | 11/2001 | Eidloth | | 474/8 |
| 6,336,878 B1 * | 1/2002 | Ehrlich et al. | | 474/28 |
| 6,342,024 B1 * | 1/2002 | Walter et al. | | 475/210 |
| 6,361,456 B1 * | 3/2002 | Walter | | 474/18 |
| 6,506,136 B2 * | 1/2003 | Schmid et al. | | 474/18 |
| 6,669,588 B2 * | 12/2003 | Schmid | | 474/18 |
| 6,786,844 B2 * | 9/2004 | Fritzer et al. | | 475/210 |
| 7,131,921 B2 * | 11/2006 | Walter et al. | | 474/8 |
| 7,967,707 B2 * | 6/2011 | Faust | | 474/28 |
| 8,052,555 B2 * | 11/2011 | Muller et al. | | 474/18 |
| 2005/0209031 A1 * | 9/2005 | Walter et al. | | 474/18 |
| 2005/0233842 A1 * | 10/2005 | Shioiri et al. | | 474/19 |
| 2006/0009321 A1 * | 1/2006 | Carlson et al. | | 474/18 |
| 2006/0040773 A1 * | 2/2006 | Mizon | | 474/18 |
| 2006/0058130 A1 * | 3/2006 | Vornehm et al. | | 474/28 |
| 2006/0105867 A1 * | 5/2006 | Reuschel | | 474/18 |
| 2007/0197322 A1 * | 8/2007 | Faust | | 474/18 |
| 2007/0207884 A1 * | 9/2007 | Unno | | 474/18 |
| 2007/0249440 A1 * | 10/2007 | Nozawa et al. | | 474/28 |
| 2007/0298917 A1 * | 12/2007 | Faust | | 474/18 |
| 2008/0039251 A1 * | 2/2008 | Faust | | 474/18 |
| 2008/0312013 A1 * | 12/2008 | Unno et al. | | 474/18 |
| 2009/0176607 A1 * | 7/2009 | Muller et al. | | 474/18 |
| 2009/0197717 A1 * | 8/2009 | Kremer et al. | | 474/18 |

* cited by examiner

BELT-DRIVEN CONTINUOUSLY VARIABLE TRANSMISSION

CROSS REFERENCE TO RELATED APPLICATIONS

This application is a National Stage of International Application No. PCT/JP2011/056969 filed Mar. 23, 2011, the contents of which are incorporated herein by reference in their entirety.

TECHNICAL FIELD

This invention relates to a belt-driven continuously variable transmission adapted to change a speed ratio continuously by varying an effective diameter position of a driving belt.

BACKGROUND ART

The belt-driven continuously variable transmission is adapted to change a speed ratio continuously by varying a groove width of a pulley holding a driving belt therebetween to displace an effective diameter position of the driving belt. A primary pulley and a secondary pulley of the transmission are individually comprised of a fixed sheave and a movable sheave. A speed ratio in the belt-driven continuously variable transmission thus structured is changed continuously by displacing an effective diameter position of the driving belt by hydraulically reciprocating the movable sheave to vary a groove width of the pulley. Specifically, a main role of the primary pulley is to control the speed ratio. For this purpose, the primary pulley is provided with a primary hydraulic chamber, and the effective diameter position of the driving belt in the primary pulley is controlled by controlling hydraulic fluid delivered to the primary hydraulic chamber to actuate the movable sheave. Meanwhile, a main role of the secondary pulley is to control a torque transmitting capacity. For this purpose, the secondary pulley is provided with a secondary hydraulic chamber, and a clamping pressure for clamping the driving belt is controlled by controlling hydraulic fluid delivered to the secondary hydraulic chamber. An example of this kind of belt-driven continuously variable transmission is disclosed in Japanese Patent Laid-Open No. 2009-2414.

The belt-driven continuously variable transmission taught by Japanese Patent Laid-Open No. 2009-2414 is comprised of a hydraulic chamber to which hydraulic fluid is delivered to push a movable sheave of a pulley, and a driving torque cam mechanism and a reversely driven torque cam mechanism disposed between a movable sheave of a secondary pulley and an output gear. The driving torque cam mechanism is comprised of an input side cam member fixed to the movable sheave of the secondary pulley, and an output side cam member integrated with the output gear. The driving torque cam mechanism thus structured is adapted to create a thrust force for pushing the movable sheave of the secondary pulley toward the fixed sheave by a relative rotation between the input side cam member and the output side cam member when the belt-driven continuously variable transmission is transmitting the driving force in the direction to propel the vehicle in the forward direction. Meanwhile, the reversely driven torque cam mechanism is comprised of an output side driven cam member fixed to the movable sheave of the secondary pulley, and an input side driven cam member integrated with the output gear. The reversely drive torque cam mechanism thus structured is adapted to create a thrust force for pushing the movable sheave of the secondary pulley toward the fixed sheave by a relative rotation between the input side driven cam member and the output side driven cam member when the belt-driven continuously variable transmission is transmitting the driving force in the reverse direction.

Meanwhile, international publication WO2010/021218 discloses a hydraulic control system comprised of a supply-side control valve for delivering hydraulic fluid to primary and secondary chambers, and a drain-side control valve for draining the fluid from those chambers. Therefore, the hydraulic fluid is confined in those primary and secondary chambers by closing those control valves.

According to the belt-driven continuously variable transmission taught by Japanese Patent Laid-Open No. 2009-2414, the driving belt is clamped by a total of the thrust force created by the driving torque cam mechanism or the reversely driven torque cam mechanism, and the thrust force of the movable sheave created by the hydraulic fluid delivered to the secondary hydraulic chamber. As described, however, the movable sheave is reciprocated to displace the effective diameter position of the driving belt. That is, in order to create a thrust force by the driving torque cam mechanism, a contact between the input side cam member and the output side cam member have to be always maintained irrespective of reciprocating motion of the movable sheave. Likewise, in order to create a thrust force by the reversely driven torque cam mechanism, a contact between the input side driven cam member and the output side driven cam member have to be always maintained irrespective of reciprocating motion of the movable sheave. Therefore, the torque cam mechanism of this kind has to be large enough to push the movable sheave certainly, and this may enlarge a size of the belt-driven continuously variable transmission.

DISCLOSURE OF THE INVENTION

In order to solve the foregoing technical problems, it is an object of this invention to provide a belt-driven continuously variable transmission having a downsized torque cam assembly for creating thrust to move a movable sheave toward a fixed sheave.

The present invention is applied to a belt-driven continuously variable transmission comprised of a drive pulley and a driven pulley, and an endless driving belt held in a belt groove of each pulley. The pulleys are individually comprised of a fixed sheave integrated with a rotary shaft and a movable sheave fitted onto the rotary shaft in a slidable manner, and a hydraulic chamber is formed on a back face of each of movable sheaves to which hydraulic fluid is delivered to reciprocate the movable sheave. The belt-driven continuously variable transmission thus structured outputs a torque while changing a speed ratio continuously by altering an effective diameter position of the driving belt by moving the movable sheave in an axial direction of the rotary shaft to vary a width of the belt groove. In order to achieve the above-explained objective, according to the present invention, the belt-driven continuously variable transmission is provided with: an output gear, which is fitted onto the rotary shaft of the driven pulley to output the torque while being allowed to rotate relatively with the rotary shaft; a piston, which is fitted onto the rotary shaft of the driven pulley between the movable sheave and the output gear while being allowed to rotate integrally with the movable sheave and to reciprocate in an axial direction of the rotary shaft, and which increases an internal pressure of the hydraulic chamber by moving toward the movable sheave; and a torque cam assembly, which is interposed between the piston and the output gear, and which pushes the piston toward the movable sheave when the torque transmitted through the driven pulley is increased.

The torque cam assembly is comprised of a first cam formed integrally with the piston, and a second cam integrated with the output gear while being allowed to achieve a relative torsional movement with the first cam.

Specifically, the first cam is comprised of a cam ridge formed on a flat face, and the second cam is comprised of another cam ridge formed on a flat face. A cam face of the cam ridge of the first cam is opposed to a cam face of said another cam ridge of the second cam.

An internal pressure of the hydraulic chamber of each of the drive and driven pulleys is confined to fix a speed ratio by closing both of a control valve for delivering the hydraulic fluid to the hydraulic chamber and a control valve for draining the hydraulic fluid from the hydraulic chamber.

Thus, according to the present invention, the piston is fitted onto the rotary shaft of the driven pulley between the movable sheave and the output gear while being allowed to rotate integrally with the movable sheave and to reciprocate in an axial direction of the rotary shaft, and the torque cam assembly is interposed between the piston and the output gear. Therefore, when the torque transmitted to the driven pulley is increased, the piston is pushed toward the movable sheave by the thrust force created by the torque cam assembly thereby increasing the internal pressure of the hydraulic chamber. For example, even when the pressure in the hydraulic chamber drops due to some kind of failure, the internal pressure is increased by the forward movement of the piston established by the torque cam assembly to ensure the belt clamping pressure required for transmitting the torque. That is, a slippage of the driving belt can be avoided. Consequently, a lifetime of the belt-driven continuously variable transmission can be extended and quality of the belt-driven continuously variable transmission can be improved. The torque cam assembly mechanically increases the internal pressure of the hydraulic chamber without regulating the pressure of the hydraulic fluid delivered to the hydraulic chamber. Therefore, the internal pressure of the hydraulic chamber can be increased in accordance with an increase in the transmission torque without delay. For this reason, drivability of the vehicle on which the belt-driven continuously variable transmission of the present invention is mounted is improved. As described, the torque cam assembly is used only to assist the belt clamping pressure of the driven pulley. That is, the torque cam assembly can be downsized so that the belt-driven continuously variable transmission thus using the torque cam assembly is downsized. Therefore, the belt-driven continuously variable transmission can be mounted on a vehicle easily.

As also described, the torque cam assembly is comprised of the first cam formed integrally with the piston, and the second cam integrated with the output gear while being allowed to achieve a relative torsional movement with the first cam. That is, the torque cam assembly is allowed to create forward thrust by a torque difference between the first cam and the second cam. As described, the second cam is integrated with the output gear allowed to rotate relatively with the rotary shaft, and a retrograde movement of the output gear is prevented. Meanwhile, the first cam is integral with the piston allowed to reciprocate on the rotary shaft. Therefore, when the thrust force created by the torque cam assembly exceeds a reaction established by the internal pressure of the hydraulic chamber, the first cam is isolated away from the second cam, that is, the piston is moved toward the movable sheave. Thus, the internal pressure of the hydraulic chamber can be increased by the forward movement of the piston so that the belt clamping pressure is maintained.

Specifically, the first cam is comprised of the cam ridge and the second cam is comprised of another cam ridge, and the cam face of the cam ridge of the first cam is contacted slidably to the cam face of another cam ridge of the second cam. Therefore, when the relative torsional movement between the first and the second cams is achieved by the torque difference therebetween, the first cam is isolated away from the second cam by the thrust force created by the cam ridges.

According to the present invention, the speed ratio can be fixed by confining the hydraulic pressure in the hydraulic chamber of each drive and driven pulleys. This means that it is not necessary to regulate the pressure of the hydraulic fluid delivered to the hydraulic chambers for the purpose of keeping the internal pressure of the hydraulic chambers to a constant level when fixing the speed ratio. Therefore, energy will not be wasted to regulate the hydraulic pressure or to deliver the hydraulic fluid thus regulated. In addition, even if a leakage occurs when the internal pressure of the hydraulic chamber of the driven pulley is thus confined, the belt clamping pressure is assisted by the thrust force created by the torque cam assembly. For this reason, a slippage of the driving belt can be prevented so that the fuel economy of the vehicle on which the belt-driven continuously variable transmission is mounted is improved.

BEST MODE FOR CARRYING OUT THE INVENTION

Figure 1:
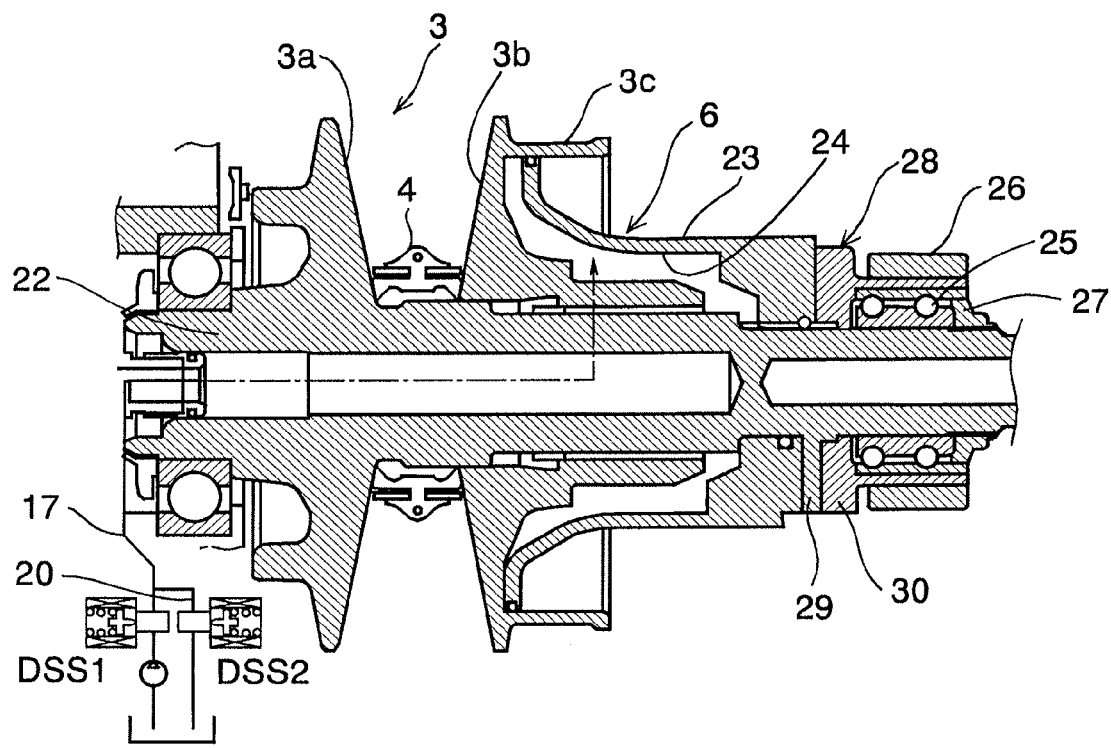
FIG. 1 is a view schematically illustrating an example of the driven pulley of the belt-driven continuously variable transmission according to the present invention.

Next, the present invention will be explained in more detail. The belt-driven continuously variable transmission of the present invention is comprised of a driving pulley, a driven pulley of an output side, and a driving belt applied to those pulleys. Accordingly, a speed ratio in the belt-driven continuously variable transmission is changed by displacing an effective diameter position of the driving belt continuously. Specifically, the effective diameter position of the driving belt is displaced by changing a width of V-shaped groove (as will be called a belt groove hereinafter) of each pulley. Each pulley is individually comprised of a pair of sheaves, and a conical surface is formed on an inner face of each sheave to be opposed to each other. One of those sheaves is integrated with a rotary shaft (as will be called a fixed sheave hereinafter), and the other sheave is allowed to reciprocate with respect to the fixed sheave (as will be called a movable sheave hereinafter). Accordingly, the belt groove is formed between the conical faces of those sheaves. In addition, each movable sheave is individually provided with a hydraulic chamber on its back side. Therefore, the movable sheave is reciprocated by delivering hydraulic fluid to the hydraulic chamber, and a belt clamping pressure is changed by controlling the hydraulic pressure applied to the hydraulic chamber.

According to the preferred example of the present invention, an output gear is fitted onto a rotary shaft of the driven pulley in a manner to rotate relatively therewith. Between the output gear and the movable sheave of the driven pulley, a piston is also fitted onto the rotary shaft while being allowed to rotate together with the movable sheave, and to reciprocate on the rotary shaft. Therefore, the hydraulic fluid in the hydraulic chamber is pressurized by moving the piston toward the movable sheave. In addition, a torque cam assembly comprising a first cam formed integrally with the piston and a second cam integrated with the output gear is disposed between the piston and the output gear. The torque sensor mechanism is adapted to create a forward thrust utilizing a torque difference between the first cam and the second cam. To this end, each cam is individually provided with a cam ridge, and cam faces of those ridges are brought into contact with each other in a slidable manner. For example, when the driven pulley is transmitting a large torque, a relative sliding movement between the cam faces contacted with each other is achieved by a torque difference therebetween. In this situation, the first cam is isolated away from the second cam by a thrust force (or thrust load) resulting from a relative torsional movement between the first cam and the second cam. As a result, the piston is pushed toward the movable sheave of the driven pulley by the thrust force thus created thereby pressurizing the hydraulic fluid in the hydraulic chamber of the driven pulley. As a result, the belt clamping pressure of the driven pulley is increased.

Figure 3:
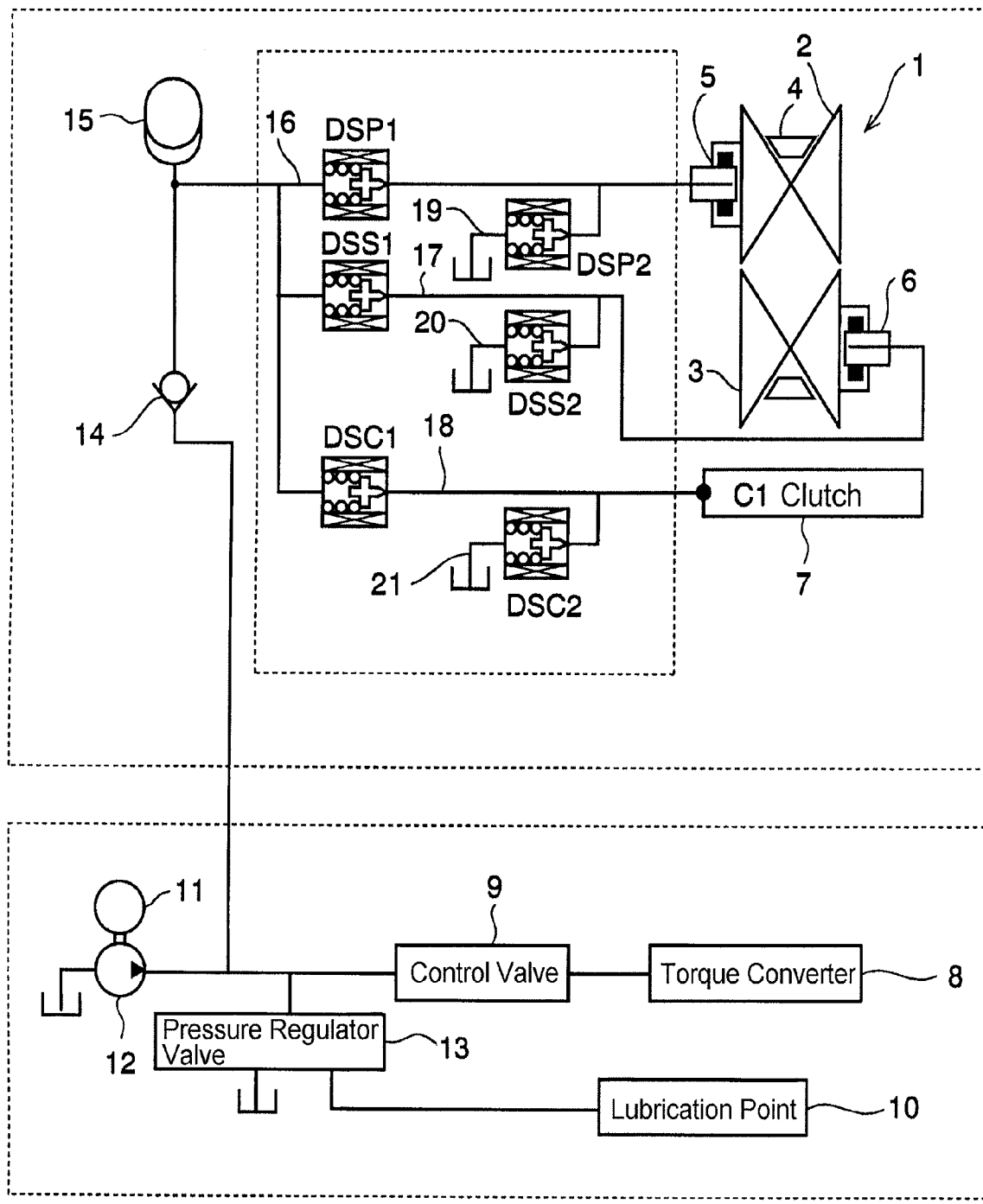
FIG. 3 is a view schematically illustrating an exemplary hydraulic circuit for delivering hydraulic fluid to the belt-driven continuously variable transmission of the present invention.

Referring now to FIG. 3, there is shown a preferable example of a hydraulic circuit for delivering hydraulic fluid to the belt-driven continuously variable transmission according to the present invention. The continuously variable transmission 1 is comprised of a drive pulley 2, a driven pulley 3, and a driving belt 4 applied to those pulleys 2 and 3 to transmit a torque therebetween. Specifically, the drive pulley 2 is comprised of a fixed sheave 2a and a movable sheave 2b, and an actuator 5 arranged on a back face of the movable sheave 2b. The driving belt 4 is held in a V-shaped belt groove formed between the sheaves 2a and 2b, and a speed ratio in the continuously variable transmission 1 is changed continuously by reciprocating the movable sheave 2a by the hydraulic fluid delivered to the actuator 5 to displace an effective diameter position of the driving belt 4 in the belt groove. Meanwhile, the driven pulley 3 is comprised of a fixed sheave 3a and a movable sheave 3b, and an actuator 6 arranged on a back face of the movable sheave 3b. The driving belt 4 is also held in a V-shaped belt groove formed between the sheaves 3a and 3b, and a clamping pressure for clamping the driving belt 4 is controlled by reciprocating the movable sheave 3a by the hydraulic fluid delivered to the actuator 6.

A C1 clutch 7 is disposed on either input or output side of the continuously variable transmission 1 to selectively transmit a drive torque. In this preferred example, a wet-type multiple disc clutch serves as the C1 clutch 7, and the torque transmitting capacity of the C1 clutch 7 varies in accordance with hydraulic pressure applied thereto. Specifically, the torque transmitting capacities of the continuously variable transmission 1 and the C1 clutch 7 are controlled hydraulically in such a way to transmit the torque to propel the vehicle. To this end, high-pressure hydraulic fluid is delivered to the actuators 5, 6 and C1 clutch 7 to increase the torque transmitting capacities. Accordingly, in the continuously variable transmission 1, the hydraulic actuators 5, 6, the C1 clutch 7 and a hydraulic chamber thereof form a high pressure section.

A conventional torque converter 8 having a lock-up clutch (not shown) is disposed on a power train connected to the continuously variable transmission 1. The torque converter 8 is adapted to multiply torque when a speed ratio between a pump impeller and a turbine runner is within a range smaller than a predetermined value, in other words, difference between rotational speeds of the pump impeller and the turbine runner is large. However, in contrast, the torque converter 8 merely serves as a fluid coupling without multiplying the torque when the speed ratio between the pump impeller and the turbine runner is within a range larger than the predetermined value, in other words, difference between rotational speeds of the pump impeller and the turbine runner is small. The lock-up clutch physically links a front cover integrated with the pump impeller and a hub integrated with the turbine runner via a friction plate.

A (lock-up) control valve 9 is provided to control hydraulic pressure applied to the lock-up clutch of the torque converter 8. Specifically, the control valve 9 alters a direction and a pressure of the hydraulic fluid delivered to the lock-up clutch to provide for a reciprocating motion of the lock-up clutch thereby engaging the friction plate of the lock-up clutch selectively with the front cover. To this end, the control valve 9 is adapted to be actuated by relatively low pressure.

In the power train including the continuously variable transmission 1 and the torque converter 8, the hydraulic fluid is delivered to a number of frictional contact points and sliding members such as bearings for the purpose of cooling and lubricating those frictional contact points and sliding members. For these purposes, it is unnecessary to pressurize the hydraulic fluid but necessary to deliver a required amount of fluid to the lubrication point 10. Accordingly, the lubrication point 10, the control valve 9, and the torque converter 8 form a low pressure section.

Next, a system for delivering and withdrawing the hydraulic fluid to/from the high pressure section and the low pressure section will be explained hereinafter. In the preferred example shown in FIG. 3, a hydraulic pump 12 is employed as a hydraulic source, and hydraulic pump 12 is driven by a prime mover 11 of the vehicle. For example, any of an internal combustion engine such as a gasoline engine and a diesel engine, a motor, and a hybrid drive unit (HV) formed by combining the engine and the motor may be employed as the prime mover 11. In addition, another hydraulic pump may be arranged in parallel with the hydraulic pump 12 according to need.

In order to regulate a pressure of the hydraulic fluid discharged from the hydraulic pump 12 to a predetermined line pressure, a pressure regulator valve 13 is disposed in the low pressure section between the hydraulic pump 12 and the control valve 9 and the lubrication point 10. Therefore, hydraulic fluid depressurized by the pressure regulator valve 13 is delivered to the low pressure section including the control valve 9 and the lubrication point 10.

A discharge outlet of the hydraulic pump 12 is connected with an accumulator 15 through a passage, and a check valve 14 is disposed on the passage between the hydraulic pump 12 and the accumulator 15. Specifically, the check valve 14 is a one-way valve that is opened to allow the fluid to flow toward the accumulator 15, and that is closed to block the fluid flowing in the opposite direction. In the accumulator 15, a piston being pushed by an elastic member or an elastic expansive member is arranged in an accumulating chamber. Therefore, a pressure higher than an elastic force of the elastic member or the expansive member is accumulated in the accumulator 15. The accumulator 15 is connected with the actuator 5 of the drive pulley 2, the actuator 6 of the driven pulley 3 and the C1 clutch 7.

A feeding control valve DSP1 is disposed on a feeding passage 16 for delivering the hydraulic fluid from the accumulator 15 to the actuator 5 of the drive pulley 2. Therefore, the hydraulic fluid is delivered from the accumulator 15 selectively to the actuator 5 by electrically opening or closing the feeding control valve DSP1. Likewise, a feeding control valve DSS1 is disposed on a feeding passage 17 for delivering the hydraulic fluid from the accumulator 15 to the actuator 6 of the driven pulley 3. Therefore, the hydraulic fluid is delivered from the accumulator 15 selectively to the actuator 6 by electrically opening or closing the feeding control valve DSS1. In addition, a feeding control valve DSC1 is disposed on a feeding passage 18 for delivering the hydraulic fluid from the accumulator 15 to the C1 clutch 7. Therefore, the hydraulic fluid is delivered from the accumulator 15 selectively to the C1 clutch 7 by electrically opening or closing the feeding solenoid valve DSC1.

A drain passage 19 branches from the feeding passage 16 to connect the actuator 5 of the drive pulley 2 with a drain spot such as an oil pan, and a drain control valve DSP2 is disposed thereon. Therefore, the hydraulic fluid is drained selectively from the actuator 5 by electrically opening or closing the drain control valve DSP2. Likewise, a drain passage 20 branches from the feeding passage 17 to connect the actuator 6 of the driven pulley 3 with an oil pan, and a drain control valve DSS2 is disposed thereon. Therefore, the hydraulic fluid is drained selectively from the actuator 6 by electrically opening or closing the drain control valve DSS2. In addition, a drain passage 21 branches from the feeding passage 18 to connect the C1 clutch 7 with an oil pan, and a drain solenoid control DSC2 is disposed thereon. Therefore, the hydraulic fluid is drained selectively from the C1 clutch 7 by electrically opening or closing the drain control valve DSC2.

For example, a poppet valve, a check valve etc. adapted to prevent a leakage when it is closed may be used as the control valves DSP1, DSS1, DSC1, DSP2, DSS2 and DSC2. In this preferred example, the poppet valve will be explained for the sake of convenience. Specifically, the poppet valve is comprised of a valve element having a tapered or hemispherical leading end, a valve seat, an armature to which the valve element is attached, a spring for pushing the valve element onto the valve seat, and an electromagnetic coil adapted to withdraw the armature away from the valve seat against an elastic force of the spring. Therefore, when the electromagnetic coil is not energized, the valve element is pushed onto the valve seat by the spring force to disconnect an input port from an output port. In contrast, when the electromagnetic coil is energized, the valve element is withdrawn away from the valve seat together with the armature to provide a communication between the input port and the output port. Thus, the feeding passages 16, 17 and 18, and the drain passage 19, 20 and 21 are open and closed by the forgoing procedures.

Referring now to FIG. 1, there is shown a preferred example of the driven pulley 3 of the belt-driven continuously variable transmission 1 according to the present invention. As illustrated in FIG. 1, a cylindrical boss 3c protrudes from the back side of the movable sheave 3b in an axial direction of a rotary shaft 22. A cylindrical member 23 is fitted onto the rotary shaft 22 of the driven pulley 3 through a ball spline while being allowed to reciprocate in the axial direction of the rotary shaft 22, and one of end portions of the cylindrical member 23 is housed in an inner circumference of the boss 3c. Consequently, a hollow hydraulic chamber 24 is formed by an inner face of the cylindrical member 23 and the back face of the movable sheave. The above-explained feeding passage 17 on which the feeding control valve DSS1 is disposed, and the drain passage 20 on which the drain control valve DSS2 is disposed are connected to the hydraulic chamber 24. Therefore, the hydraulic chamber 24 is allowed to serve as an actuator 6 for pushing the movable sheave 3b by feeding the hydraulic fluid thereto.

When the speed ratio is kept to a predetermined ratio by closing both of the control valves DSS1 and DSS2 to block delivery and draining of the hydraulic fluid to/from the hydraulic chamber 24, an internal pressure of the hydraulic chamber 24 can be raised by propelling the cylindrical member 23 toward the movable sheave 3b. Thus, the cylindrical member 23 serves as the piston of the present invention.

As illustrated in FIG. 1, an output gear 26 is also fitted onto the rotary shaft 22 through a bearing 25 on the opposite side of the movable sheave 3b so that the output gear is allowed to be rotated relatively with the rotary shaft 22. For example, an external helical gear in which the tooth trace is helix may be used as the output gear 26, and the output gear 26 is retained by a locknut 27 to prevent a retrograde movement. A torque cam assembly 28 according to the present invention is interposed between the cylindrical member 23 and the output gear 26. Specifically, the torque cam assembly 28 is comprised of a first cam 29 of the driving side formed integrally with the other end portion of the cylindrical member 23, and a second cam 30 of the driven side integrated with the output gear 26. Therefore, the torque of the first cam 30 is transmitted to the output gear 26 through the second cam 30 thus engaged with the first cam 29.

Figure 2:
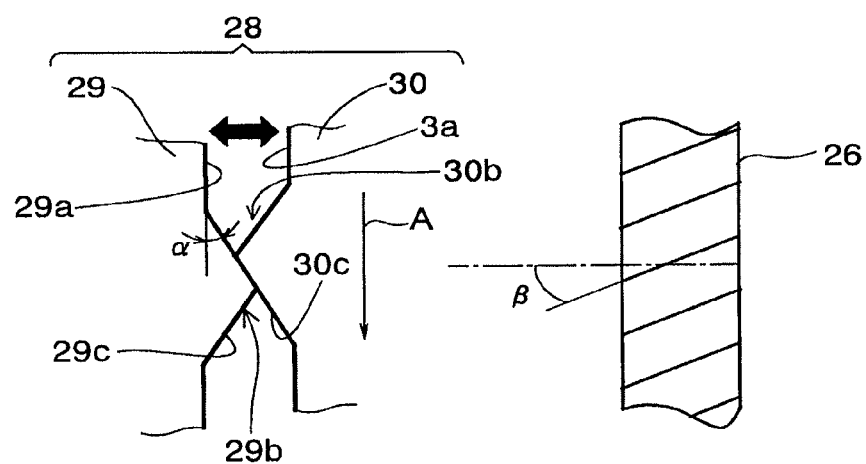
FIG. 2 is a view schematically illustrating an example of the torque sensor mechanism according to the present invention.

FIG. 2 shows a preferred example of a structure of the torque cam assembly 28 of the present invention. As illustrated in FIG. 2, a cam ridge 29b is formed on a flat surface 29a of the first cam 29, and a cam ridge 30b is formed on a flat surface 30a of the second cam 30. Those first cam 29 and the second cam 30 are opposed to each other so that a tapered cam face 29c of the first cam 29 is engaged with a tapered cam face 30c of the second cam 30 to transmit the torque therbetween. A height of each cam ridge 29b and 29c is determined based on an experiment or a result of simulation. An angle $\alpha$ of inclination of the cam face with respect to the flat surface is identical in both of the first cam 29 and the second cam 30. The angle $\alpha$ of each cam face 29c, 30c is individually smaller than e.g., a helical angle $\beta$ of the tooth of the output gear 26 as a helical gear.

Accordingly, when the first cam 29 and the second cam 30 are completely engaged with each other, the torque cam assembly 28 is rotated in synchronization, in other words, the first cam 29 and the second cam 30 are rotated at same speeds. Consequently, a torque is transmitted to the output gear 26 through the torque cam assembly 28 in accordance with the speed ratio of the continuously variable transmission 1. However, when the torque transmitted to the driven pulley 3 is increased for example, the thrust force created by the first cam 29 and the second cam 30 exceeds a reaction established by the internal pressure of the hydraulic chamber 24. In this situation, those first cam 29 and the second 30 start rotating out of synchronization.

In FIG. 2, an arrow "A" represents a rotational direction of the second cam 30 integrated with the output gear 26. For example, when the cams 29 and 30 are released from the complete engagement so that the rotation of the cam 30 is delayed with respect to the rotation of the cam 29, slippage occurs between the cam face 29c and the cam face 30c. That is, in this situation, the cam faces 29c and 30c slide relative to each other in the axial direction as a result of relative torsional movement between the first cam 29 and the second cam 30. As a result, the first cam 29 is moved away from the second cam 30 by the forward thrust. Specifically, the thrust force thus created is governed by a height of each cam ridge 29b and 30b, and a rotational deviation between the first cam 29 and the second cam 30. Therefore, the thrust force can be increased by increasing the heights of the cam ridges 29b and 30b.

As described, the second cam 30 is integrated with the output gear 26, and the output gear 26 is retained by the locknut 27. Therefore, a retrograde motion of the second cam 30 is prevented by the locknut 27. Meanwhile, the first cam 29 is integrated with the cylindrical member 23 which is allowed to reciprocate in the axial direction of the rotary shaft 22. Therefore, the cylindrical member 23 is moved toward the movable sheave 3b when the thrust force is increased by the relative torsional movement between the first cam 29 and the second cam 30. As a result, a capacity of the hydraulic chamber 24 is compressed by the cylindrical member 23 thus moved forward thereby increasing the internal pressure of the hydraulic chamber 24. Therefore, a clamping pressure of the driven pulley 3 is increased so that a slippage of the driving belt 4 can be prevented even when the torque of the driven pulley 3 is increased.

The belt-driven continuously variable transmission 1 is required to transmit a large torque when a large driving force is required, for example, when starting the vehicle, when accelerating the vehicle, when climbing a hill etc. In those cases, the hydraulic chamber 24 is required to establish the clamping pressure for holding the driving belt 4 according to such increased torque. However, a delivery of hydraulic fluid to the hydraulic chamber 24 may be delayed inevitably and this may cause a slippage of the driving belt 4. The slippage of the driving belt 4 may also occur when the torque inputted from the output gear 26 is increased abruptly as a result of a slippage of the wheels on a low friction road surface. In addition, the slippage of the driving belt 4 may also occur when the internal pressure in the hydraulic chamber 24 drops due to leakage of the fluid occurring in spite of confining the fluid therein to fix the speed ratio by closing both of the control valves DSS1 and DSS2. In short, such slippage of the driving belt 4 occurs due to shortage of the clamping pressure of the driven pulley 3 resulting from a shortage of the internal pressure in the hydraulic chamber 24, with respect to the thrust force of the torque cam assembly 28.

However, according to the belt-driven continuously variable transmission 1, the cylindrical member 23 is mechanically pushed forward by the thrust force created by the torque cam assembly 28 when the thrust force of the torque cam assembly 28 exceeds the reaction force derived from the internal pressure of the hydraulic chamber 24. Therefore, the hydraulic fluid in the hydraulic chamber 24 can be pressurized without delivering the hydraulic fluid to the hydraulic chamber 24 through the hydraulic circuit shown in FIG. 3. That is, it is unnecessary to regulate the pressure of the hydraulic fluid. Moreover, the transmission torque can be increased without waiting a rise in the internal pressure of the hydraulic chamber 24. Thus, according to the present invention, the clamping pressure of the driven pulley 3 for clamping the driving belt 4 can be increased quickly to a required level to transmit the torque. For this reason, a slippage of the driving belt 4 can be prevented even if the torque being transmitted is increased abruptly. In addition, a drive feeling can be improved. Further, an energy loss resulting from regulating the pressure of the fluid being delivered to the hydraulic chamber 24, as well as an energy loss resulting from increasing the discharge pressure of the hydraulic pump 12 can be reduced. Therefore, fuel economy of the vehicle can be improved.

Thus, according to the belt-driven continuously variable transmission 1 of the present invention, a belt clamping pressure required for transmitting the torque can be assisted by the thrust force of the torque cam assembly 28 even when the pressure in the hydraulic chamber 24 drops due to some kind of failure. Therefore, a slippage of the driving belt will not be caused by a drop in the internal pressure of the hydraulic chamber 24 so that abrasions of the belt-driven continuously variable transmission 1 can be reduced. In addition, even if the internal pressure of the hydraulic chamber 24 drops due to leakage of the fluid in spite of closing both of the control valves DSS1 and DSS2 to confine the fluid therein to fix the speed ratio, the belt clamping pressure required to transmit the torque can be assisted by the thrust force created by the torque cam assembly 28. As described, the torque cam assembly 28 is used only to assist the belt clamping pressure of the driven pulley 3. That is, the torque cam assembly 28 can be downsized so that the belt-driven continuously variable transmission 1 thus using the torque cam assembly 28 is downsized. Therefore, the belt-driven continuously variable transmission 1 can be mounted on a vehicle easily. In addition, a lifetime of the belt-driven continuously variable transmission 1 can be extended, that is, quality of the belt-driven continuously variable transmission 1 can be improved.

The invention claimed is:

1. A belt-driven continuously variable transmission, comprising:
a drive pulley and a driven pulley, each of which is formed by a fixed sheave integrated with a rotary shaft, and a movable sheave fitted onto the rotary shaft in a slidable manner;
a hydraulic chamber formed on a back face of each of said movable sheaves to which hydraulic fluid is delivered to reciprocate the movable sheave;
an endless driving belt held in a belt groove of each of the pulleys; and
wherein the belt-driven continuously variable transmission is adapted to output a torque while changing a speed ratio continuously by altering an effective diameter position of the driving belt by moving the movable sheave in an axial direction of the rotary shaft to vary a width of the belt groove;
an output gear, which is fitted onto the rotary shaft of the driven pulley to output the torque while being allowed to rotate relatively with the rotary shaft;
a piston, which is fitted onto the rotary shaft of the driven pulley between the movable sheave and the output gear while being allowed to rotate integrally with the movable sheave and to reciprocate in an axial direction of the rotary shaft, and which increases an internal pressure of the hydraulic chamber by moving toward the movable sheave; and
a torque cam assembly, which is interposed between the piston and the output gear, and which pushes the piston toward the movable sheave when the torque transmitted through the driven pulley is increased.

2. The belt-driven continuously variable transmission as claimed in claim 1, wherein the torque cam assembly is comprised of:
a first cam formed integrally with the piston; and
a second cam integrated with the output gear while being allowed to achieve a relative torsional movement with the first cam.

3. The belt-driven continuously variable transmission as claimed in claim 2, wherein:
the first cam is comprised of a cam ridge formed on a flat face;
the second cam is comprised of another cam ridge formed on a flat face; and a cam face of the cam ridge of the first cam is opposed to a cam face of said another cam ridge of the second cam.

4. The belt-driven continuously variable transmission as claimed in claim 1,
wherein an internal pressure of the hydraulic chamber of each of the drive and driven pulleys is confined to fix a speed ratio by closing both of a control valve for delivering the hydraulic fluid to the hydraulic chamber and a control valve for draining the hydraulic fluid from the hydraulic chamber.

5. The belt-driven continuously variable transmission as claimed in claim 2,
wherein an internal pressure of the hydraulic chamber of each of the drive and driven pulleys is confined to fix a speed ratio by closing both of a control valve for delivering the hydraulic fluid to the hydraulic chamber and a control valve for draining the hydraulic fluid from the hydraulic chamber.

6. The belt-driven continuously variable transmission as claimed in claim 3, wherein an internal pressure of the hydraulic chamber of each of the drive and driven pulleys is confined to fix a speed ratio by closing both of a control valve for delivering the hydraulic fluid to the hydraulic chamber and a control valve for draining the hydraulic fluid from the hydraulic chamber.

* * * * *